Dec. 1, 1959 L. E. VARADI 2,914,919
COMBINATION EXHAUST CASING AND SHAFT SUPPORT FOR A TURBINE
Filed Dec. 31, 1957 2 Sheets-Sheet 1
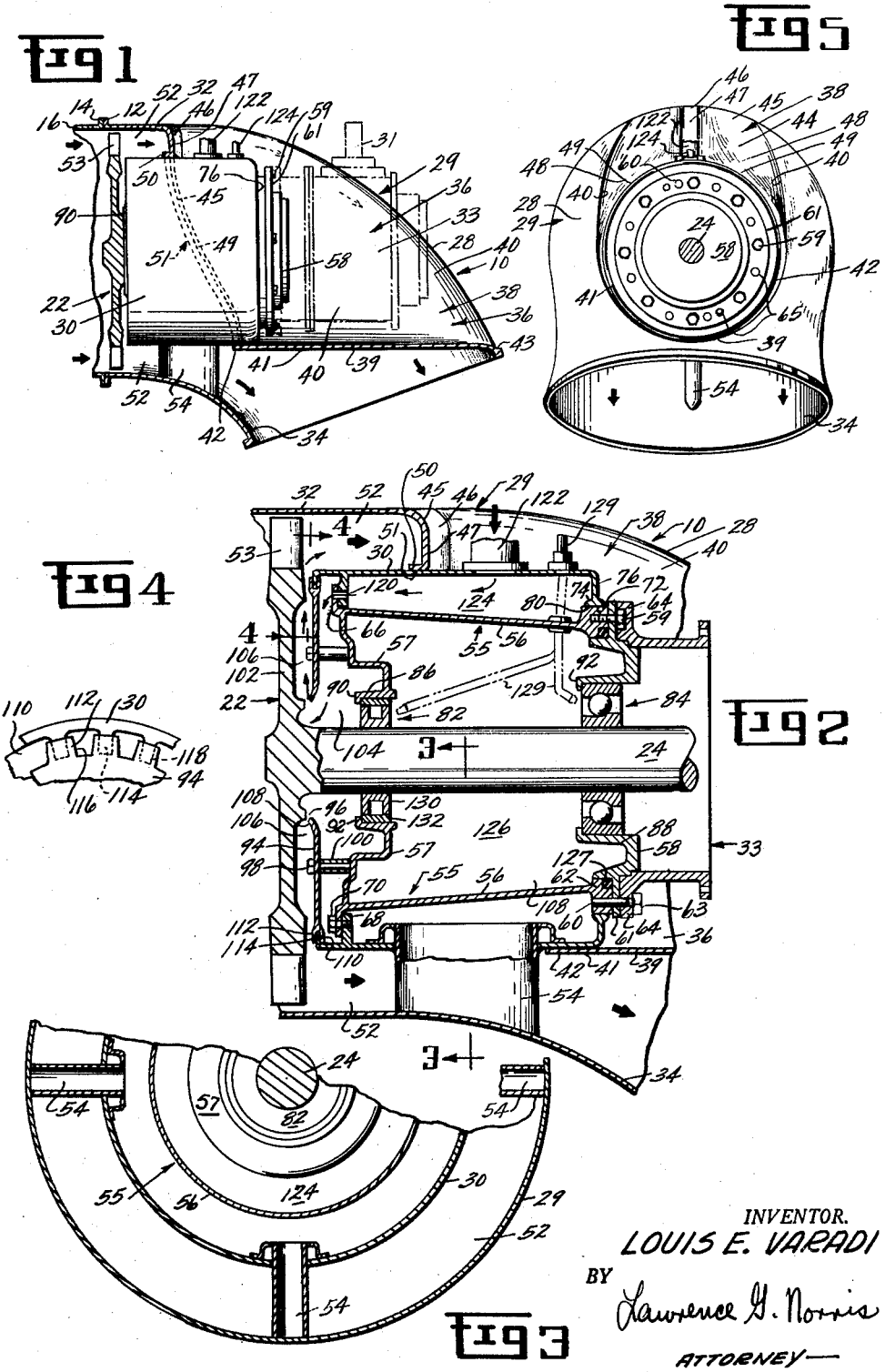
INVENTOR.
LOUIS E. VARADI
BY
Lawrence G. Norris
ATTORNEY—

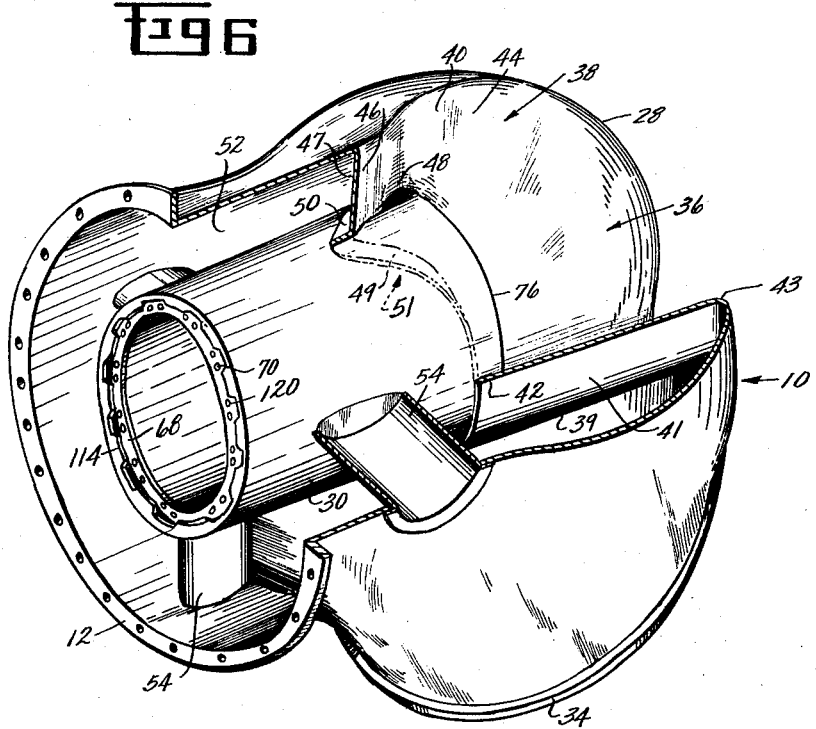

United States Patent Office 2,914,919
Patented Dec. 1, 1959

2,914,919

COMBINATION EXHAUST CASING AND SHAFT SUPPORT FOR A TURBINE

Louis Ernest Varadi, Danvers, Mass., assignor to General Electric Company, a corporation of New York Application December 31, 1957, Serial No. 706,422

11 Claims. (Cl. 60—39.31)

The present invention relates to a turbo machine and in particular to a gas turbo-propeller engine of the type described in U.S. Patent Application Serial No. 548,987 filed by Gerald William Lawson, November 25, 1955 and having a gas turbine for supplying power to the compressor and a free power turbine axially aligned with the gas turbine for supplying power to the load. Exhaust gases pass from the gas turbine to the free power turbine which is mounted in the forward section of a curved tail pipe. The power turbine shaft extends aft through the wall of a depression formed in the rear casing wall of the tail pipe. The power turbine and the power turbine shaft are mounted on and supported by such wall by means of a bearing mounted on a pad which is in turn mounted on the outside of the wall and in the space formed by the depression. A reduction gearing is also mounted on the pad and in the depression. Consequently, the reduction gearing and bearing are both removed from the flow of hot exhaust gases passing through the tail pipe and the curve in the tail pipe directs the hot exhaust gases away from the shaft emerging from the rear wall thereof. The depression strengthens the relatively thin, light casing shell or skin without adding extra weight so that it can thus support the weight and thrust of the turbine, turbine shaft and reduction gearing without the necessity of adding any structural members. The depression also provides a space for the reduction gearing and pad.

Although the tail pipe construction shown in the above mentioned application has many advantages, as set forth therein, buckling of the relatively thin casing skin is still apt to occur due to the extremely heavy loads applied thereto by the turbine assembly and reduction gearing. Furthermore, assembly and disassembly is difficult and hence time consuming and expensive. Also the turbine shaft and bearings and lubricant supplied thereto are subjected to intense heat due to the close proximity thereof to the hot exhaust gases and migration of hot exhaust gases radially inwardly. This is especially true in the case of the forward bearing located within the tail pipe. It is also difficult to properly lubricate the bearings and buckling is apt to occur due to differential thermal expansion and contraction of the parts.

An object of the present invention is to provide a tail pipe construction of the type described above in which the free turbine assembly is supported by the tail pipe casing skin or shell and the turbine shaft extends through the casing wall, but in which the above mentioned disadvantages are avoided. Consequently, it is an object of the present invention to provide a tail pipe assembly of the type described above in which the structural strength of the casing skin, and hence its capacity to support the turbine assembly and reduction gearing, is substantially increased to thereby reduce structural failure, without increasing the thickness of the skin or materially increasing the total weight of the tail pipe assembly. It is another object to provide such a tail pipe construction which is simple to assemble and disassemble and hence which can be assembled and disassembled rapidly and inexpensively. It is another object to eliminate overheating of the turbine shaft and bearings as well as the lubricant supplied thereto. It is another object to provide proper lubrication of the turbine shaft and bearings under all conditions of operation. It is another object to eliminate distortion and buckling due to differential thermal expansion and contraction of the parts.

Briefly stated and in accordance with one aspect of the present invention the tail pipe casing is provided with an inner hollow shell or skin which extends from inside the casing through an end wall thereof, such inner shell being mounted in and supported by such wall and having a longitudinal axis which is parallel to the longitudinal axis of the turbine shaft. The turbine assembly is mounted in and supported by the inner shell, so that the load is transmitted through the inner shell and thence through the supporting wall to the main tail pipe casing which may be referred to as an outer shell or skin.

The wall is wrapped around the periphery of the inner shell. More particularly, the wall comprises a pair of oppositely facing side portions forming with a floor portion a cylinder segment, preferably a semi-cylinder, open at both ends. The inner shell is telescoped within and joined to the forward end section of such cylinder segment. The side walls forming such end section extend forwardly while at the same time extending upwardly and diverging inwardly and transversely to the turbine axis toward and into each other and around the periphery of the inner shell to form a forward wall portion extending transversely to the turbine axis. Preferably the forward wall portion is generally V-shaped. The edge of the diverging wall portions adjacent to the inner shell is flanged in the direction of the turbine axis, such flange conforming to the contour of and overlapping the inner shell to form with the above mentioned end section of the cylinder segment a sort of cylinder which snugly receives the inner shell and to which the inner shell is joined. Thus the wall is literally wrapped diagonally around the inner shell. The resulting joint extends from top to bottom and fore to aft along a diagonal sinuous path around the periphery of the inner shell. Preferably each half of the joint from top to bottom has the general configuration of an S located on its side.

A housing is provided within and supported by the inner shell and is concentric with and spaced radially inwardly from the inner shell to form therewith an annular space. The housing is provided with end walls in which the turbine shaft is rotatably mounted in forward and aft bearings mounted in the forward and aft end walls respectively. The housing is mounted in the inner shell by means of cooperating flanges, which form end closures for the annular space between the housing and inner shell, to provide a cooling chamber around the periphery of the housing and a lubricant chamber within the housing through which the turbine shaft passes. The end walls and peripheral wall of the housing together with the connecting flanges and the inner shell form a web-like structure which adds greatly to the structural strength of the tail pipe. Since they are all made from thin material they do not materially add to the weight of the tail pipe.

Cooling fluid is directed through the cooling chamber to provide a moving layer of cooling fluid around the periphery of the housing. A baffle arrangement directs a moving layer of cooling fluid along the forward wall of the housing and radially outwardly along the face of the turbine disc into the stream of exhaust gases passing from the turbine through an exhaust duct formed between the inner shell and outer shell and thence at an angle through the exhaust section of the tail pipe.

The aft end wall of the housing is located outside of the tail pipe and can be easily removed. Thereafter the turbine and turbine shaft can be slipped out of the housing and the housing can be easily slipped as a unit out of the inner shell, thereby facilitating assembly and disassembly. When the aft end wall is secured to the housing the turbine shaft is locked in the housing and the housing is locked in the inner shell.

The mounting between the housing and inner shell includes a ring on the inner shell in which an end of the housing is snugly but slidably received, the snugness of the fit providing the required support whereas the slidability permits longitudinal movement therebetween in response to differential thermal expansion and contraction of the inner shell and housing.

The above mentioned objects and explanation of the invention as well as other objects of the invention will become more apparent when read in the light of the accompanying specification and claims wherein the parts are designated specifically but are intended to be regarded as generically as the prior art will permit.

Fig. 1 is a view in elevation and partly in section of a tail pipe embodying a preferred embodiment of the present invention;

Fig. 2 is an enlarged section in elevation of the forward part of the tail pipe of Fig. 1;

Fig. 3 is a section taken along the line 3—3 of Fig. 2;

Fig. 4 is a section taken along the line 4—4 of Fig. 2;

Fig. 5 is an end view of the tail pipe with the reduction gear box removed;

Fig. 6 is a view in perspective showing the contour of the end wall and the opening therein through which the inner shell extends.

Referring to the figures, 10 is a tail pipe assembly which is attached by means of abutting flanges 12 and 14 (Fig. 1) to the main engine casing 16 in which are mounted a compressor, burners and gas turbine which may be arranged in the manner described and shown in the above mentioned application to Lawson.

Tail pipe assembly 10 includes a free power turbine 22 having a shaft 24 which extends aft through the rear wall 28 of tail pipe casing shell 29 to reduction gear box 33 containing reduction gears and from which drive shaft 31 extends to drive the load, which in this instance is a propeller (not shown). Free turbine 22, shaft 24 and reduction gear box 33 are mounted on and wholly supported by the tail pipe casing shell or skin 29 as hereinafter described.

Tail pipe 10 is made up of a curved or bent outer shell or skin 29 and an inner cylindrical shell or skin 30. Outer shell 29 is bent at the middle to form a forward turbine section 32, in which the free turbine 22 is located and the longitudinal axis of which is parallel to the turbine axis, and an exhaust aft section 34, which extends at an angle to the turbine axis, as shown, to deflect exhaust gases away from shaft 24 and reduction gear box 33.

The curved rear end wall 28 of outer shell 29 has a depression 36 formed therein and extending into the tail pipe, as shown. The depression is defined by depression wall 38, which is part of end wall 28 and through which inner shell 30 extends. The inner shell is mounted in and supported by the depression wall in the following manner. The depression wall comprises a floor portion 39 forming the floor of the depression. Floor portion 39 slopes upwardly into a pair of oppositely facing side portions 40. Side portions 40 extend upwardly and from fore to aft in the direction of the turbine axis. Floor portion 39 and adjacent lower parts of side portions 40 have the shape of a semi-cylinder 41 open at both ends 42 and 43, the aft end of inner shell 30 being telescoped within and joined to the forward end section 42 of the semi-cylinder 41. The parts of side walls 40 forming end section 42 of semi-cylinder 41, extend forwardly while at the same time extending upwardly and diverging outwardly, and converging at 44 toward each other and over the upper periphery of inner shell 30 to form a generally V-shaped and contoured forward wall portion 45 extending generally transversely to the turbine axis. The apex of the V extends forwardly into a narrow forward nose portion 46. The forward wall 47 of nose section 46 is substantially perpendicular to the turbine axis and extends substantially vertically above the inner shell 30. The diverging wall portions 44 form cheeks 48 bulging inwardly and rearwardly over the periphery of inner shell 30, as shown, the cheeks being contoured at 49 to conform to the contour of inner shell 30. The contours 49 form continuations of the semi-cylindrical end section 42 around the inner shell. The edge of the forward wall portion 46 which engages the inner shell is flanged forwardly at 50 in the direction of the turbine axis, such flange 50 overlapping and conforming to the contour of inner shell 30 and forming a continuation of contours 49 around the inner shell. Semi-cylindrical end section 42, contours 49 of cheeks 48 and flange 50 form what may be considered a cylinder in which the inner shell 30 is received. The periphery of the inner shell is joined to the inner surface of the cylinder, as by welding, at 51. Thus, the wall 38 is literally wrapped around the inner skin, and this arrangement is referred to as the "wrap around" feature. The resulting "wrap around" joint 51 between the inner shell 30 and depression wall 38 extends from top to bottom and fore to aft along a diagonal and sinuous path around the periphery of the inner shell as shown in Fig. 1. The path of the joint as viewed from the side in Fig. 1 has the general shape of an S laid on its side.

Inner shell 30 is also supported by outer shell 29 through three hollow, streamlined, circumferentially spaced struts 54 welded to both shells, as shown in Fig. 3. It is noted that the narrow nose section 46, 47 of the depression wall acts as a fourth strut.

The longitudinal axis of shell 30 is parallel to the longitudinal axis of shaft 24. The forward part of shell 30 is located within forward section 32, is concentric with such forward section and is spaced radially inwardly therefrom to form therewith an annular duct or space 52 into which exhaust gases pass from the turbine buckets 53. Duct 52 directs the exhaust gases around the inner shell into exhaust section 34.

Located within inner shell 30 is a hollow, frusto-conical shaped housing 55 having a peripheral wall 56, a forward end wall 57, which is integral with peripheral wall 56 and which is located within the forward section 32 of the outer shell 29, and an aft end wall 58, which is attached to the aft end of peripheral wall 56 by means of a plurality of threaded bolts 59 and guide pins 60 extending through flange 61 of wall 58 into an enlarged end portion 62 of peripheral wall 56. Aft end wall 58 is located outside the outer shell and in the depression 36. The reduction gear box 33 is attached to the housing by means of bolts 63 extending through an annular flange 64 of the reduction gear box 33, through apertures 65 in the flange 61 of end wall 58, and into enlarged end portion 62. Pins 60 also extend into flange 64.

The forward end of housing 55 is mounted in and supported by inner shell 30 by means of an annular flange 66 extending radially outwardly from the forward end of peripheral wall 56, an annular flange 68 extending radially inwardly from inner shell 30 in overlapping and abutting relationship with annular flange 66, and circumferentially spaced bolts 70 securing the two annular flanges 66 and 68 together, as shown. Flange 66 of the housing is located forwardly of flange 68 for reasons set forth hereinafter.

The aft end of housing 55 is slidably supported by the inner shell 30 by means of a radially inwardly facing cylindrical surface 72 of a ring 74 formed in the end of a flange 76 extending radially inwardly from the aft end of the inner shell 30, and a radially outwardly facing cylindrical surface 80 forming the periphery of thickened end portion 62 of peripheral wall 56 of the housing.

Surface 80 of the housing fits snugly against surface 72 of the inner shell to provide a rigid support for the housing. However, the two surfaces can move logitudinally with each other to thereby provide for differential thermal expansion and contraction of the inner shell and housing without buckling. Although the fit between the surfaces 72 and 80 is snug it is not air-tight for reasons set forth hereinafter.

Turbine 22 and shaft 24 are mounted in roller bearing 82 and ball bearing 84, which are mounted in the forward and aft walls 57 and 58 respectively of the housing 55, the shaft 24 passing through the housing and the inner shell into the depression 36 outside the tail pipe interior, as shown. The bearings 82 and 84 are mounted in hubs 86 and 88 respectively as shown. The hubs 86 and 88 are provided with retaining lips 90 and 92 respectively which are located forwardly of the bearings as shown and for reasons set forth hereinafter.

A baffle disc 94, having a central aperture 96 therein and attached to forward wall 57 by means of circumferentially spaced screws 98 and spacers 100, extends radially inwardly from the forward end of inner shell 30, as shown, and divides the space between turbine disc 102 and forward end wall 57 and flanges 66 and 68 into an end wall cooling chamber 104 and a turbine disc cooling chamber 106. Shaft 24 extends through the aperture 96 in the baffle disc 94 and the baffle disc extends forwardly into a lip 108 as shown.

Disc 94 is attached to inner shell 30 in a substantially air-tight manner by means of an annular, bifurcated portion 110 and 112 formed in the outer edge thereof and an overlapping, annular flange 114, which extends radially inwardly from inner shell 30 and is snugly received between 110 and 112. Flanges 112 and 114 are notched at 116 and 118 respectively whereas flange 110 is solid and unnotched, as best shown in Fig. 4. When the fingers between notches 116 of flange 112 are circumferentially aligned with the fingers between notches 118 of flange 114, as shown, the latter fingers are snugly received between the former fingers and flange 110 so that the baffle disc is locked to flange 114 and hence to the inner shell 30. The notches permit the baffle disc 94 to be unlocked from flange 114 by merely twisting the disc until the fingers between the notches of flange 112 are aligned with the notches of flange 114 whereupon the baffle 94 may be moved in the direction of the turbine axis to disassemble it from the inner shell. The unnotched flange 110 of baffle 94 snugly fits against the fingers of flange 114 and the inner surface of inner skin 30 to form a seal sealing off chamber 104 from chamber 106 and the exhaust gases in duct 52. In effect the baffle 94 forms a forward end wall of the inner shell 30 and prevents exhaust gases from flowing into the inner shell.

A plurality of circumferentially spaced holes 120 are provided through abutting flanges 66 and 68. A compressed air duct 122 is mounted on the top of inner shell 30 aft of wall 47 for conducting compressed air from the engine compressor into the annular chamber 124 formed by inner shell 30, the pehipheral portion 56 of housing 55, overlapping flanges 66 and 68, which form a forward end closure of the chamber, and flange 76 and thickened portion 62, which form a rear end closure for the chamber. The compressed air flows from chamber 124 through holes 120 into chamber 104 where it passes radially inwardly along the forward surface of the end wall 57 over the bearing 82, thence through aperture 96 in the baffle disc 94 and around the part of shaft 24 extending forwardly of end wall 57, thence outwardly along the aft surface of the turbine disc 102 and into the stream of exhaust gases passing from the turbine buckets 53 into the annular duct 52 between the inner and outer shells. The compressed air then passes with the exhaust gases from the duct 52 through the exhaust section 34 of the casing. Consequently, the interior of the housing through which the turbine shaft extends, the forward end wall 57 of the housing in which the bearing 82 is located, the portion of the shaft 24 forward of the housing and the turbine disc 102 are all protected from the hot exhaust gases by a layer of cooling air. The flow of compressed air radially outwardly through chamber 106 prevents hot exhaust gases from migrating radially inwardly into this chamber.

Lubricant is conducted through a lubricant conduit 129, which is mounted on the top of inner shell 30 aft of wall 47 and which extends through shell 30, chamber 124, housing periphery 56 and the interior 126 of the housing 55, to the bearings 82 and 84, as shown, so that lubricant is applied directly to the bearings at all times. The oil issuing from conduit 129 fills the interior 126 of the housing with an oil mist or vapor which aids lubrication. A sealing ring 127 is provided in an annular recess formed in the thickened annular end portion 62 of the housing and the end wall 58, as shown, to prevent the escape of oil fumes from inside the housing and to seal off the inside of the housing from the atmosphere. The moving layers of compressed air in chambers 124, 104 and 106 not only cool the bearings and shaft but also cool the oil inside the housing. Furthermore, the compressed air surounding the housing prevents the pressure in the housing from dropping at high altitudes to a pressure at which frothing of the oil might occur.

The peripheral and end walls 56, 57 and 58 of the housing, the mounting flanges 66, 68, 76 and 62 and the inner shell 30 form a web-like structure which greatly increases the structural strength of the tail pipe. They do not materially add to the weight because they are made from relatively thin stock.

The major portion of the load of the turbine, turbine shaft and reduction gearing is transmitted to the outer skin 29 through the housing, the inner skin, and the "wrap around" joint between the depression wall 38 and the inner shell. Only a small part of the load is transmitted to the outer skin through the struts 54. Just as in the above mentioned application Serial No. 548,987 to Lawson, the entire load is transmitted directly to the thin skin or shell 29 from which it is transmitted to the casing flange 12 and thence to the main engine casing 16. However, the use of the inner skin and "wrap around" feature of the present invention together with the web formed by the housing and mounting flanges greatly increase the structural strength of the tail pipe. In fact, the construction of the present invention is unique in that the thin skin or shell 29 can carry so great a load with so little weight. To demonstrate this a shell thickness as small as .032 inch can be used to carry loads as high as 3000 lbs.

The tail pipe assembly can be easily disassembled merely by removing the exposed aft end wall 58 of the housing by removing the bolts 59 (after the reduction gear box 33 has been removed by removal of bolts 63). The ball bearing assembly 84 is removed with the end wall. Thereafter the turbine assembly can be slipped forwardly out of the housing. The inner race 130 and the roller bearings of the bearing assembly 82 are removed with the turbine shaft whereas the outer race 132 is retained by the lip 90 and remains with the forward wall 57. Note that the aperture 96 is large enough to permit the passage of the shaft 24 and inner race 130 therethrough. After the turbine assembly has been removed from the housing the baffle 94 is easily removed by unscrewing screws 98 turning the baffle and thereafter pulling it out. Thereafter the housing can be easily slipped as a unit out of the forward end of the inner shell 30 upon removal of bolts 70. Assembly is just as easy. However, when the end wall 58 is bolted to the housing proper, the housing is locked in the inner shell and the turbine assembly is locked in the housing. The aft slope of peripheral wall 56, the slidable connection between surfaces 72 and 80, the location of flange 66 with respect to flange 68 and the location of lips 90 and 92 all contribute to the ease of assembly and disassembly.

While a particular embodiment of the invention has been illustrated and described, it will be obvious to those skilled in the art that various changes and modifications may be made without departing from the invention. It is intended to cover in the appended claims all such changes and modifications that come within the true spirit and scope of the invention.

I claim:

1. A tail pipe for use in turbo engines comprising an inner shell, an outer shell circumferentially spaced about said inner shell, a turbine mounted in and rotatably supported by said inner shell, oppositely facing side wall portions extending in the direction of the turbine axis from said outer shell and partially enveloping and snugly receiving the sides of said inner shell, said side wall portions converging at a common end thereof toward and into each other transversely to the turbine axis and around the periphery of said inner shell to form an end wall of said outer shell, said inner shell being mounted in said end wall.

2. A tail pipe for use in turbo engines comprising an inner shell, an outer shell circumferentially spaced about said inner shell, a turbine mounted in and rotatably supported by said inner shell, oppositely facing side wall portions extending in the direction of the turbine axis from said outer shell and spaced interiorly thereof, said side wall portions converging into a floor portion to form with said floor portion a section of a cylinder in which said inner shell is received, said side wall portions converging at a common end thereof toward and into each other transversely to the turbine axis and around the periphery of said inner shell to form an end wall of said outer shell, said inner shell being mounted in said end wall.

3. A tail pipe according to claim 2, said side wall portions having cheeks bulging over and conforming to the external contour of said inner shell and cooperating with said cylinder section to form a cylinder for receiving said inner shell, whereby said end wall is wrapped around said inner shell.

4. A tail pipe according to claim 2, said tail pipe curving transversely to said turbine axis, said outer shell and said side wall portions spaced interiorly thereof forming an exhaust passage of arcuate cross-section for working fluid exhausted from said turbine.

5. In a turbo machine, a tail pipe comprising an outer shell defining a duct for the passage of hot exhaust gas therethrough and having a free turbine and turbine shaft mounted therein, said tail pipe also comprising an inner shell supported by said outer shell and extending from within said outer shell through an end wall of said outer shell, said inner shell being mounted in said end wall and having a longitudinal axis generally parallel to the turbine axis, a housing located within said inner shell, means for mounting and supporting said housing in said inner shell, the periphery of said housing being spaced radially inwardly from said inner shell to form an annular chamber therewith, said housing having spaced walls extending transversely to the turbine axis, said shaft extending through and being rotatably supported in said walls.

6. A tail pipe according to claim 5, said turbine comprising a turbine disk, said tail pipe including means for directing a flow of cooling fluid into said chamber and from said chamber to and along the outer face of one of said spaced walls of said housing and thence along a surface of the turbine disk.

7. A tail pipe according to claim 6, said last mentioned means including a passage providing communication between said chamber and the outer face of said one of said spaced walls, and baffle means located between said spaced wall and said utrbine disk for directing a flow of cooling fluid from said passage radially inwardly along the outer face of said spaced wall and thence radially outwardly along the surface of said turbine disk to cool said face of said disk and block the migration of exhaust gases radially inwardly, said baffle means extending radially inwardly from said inner shell to form an end wall of said inner shell.

8. In a turbo machine, a tail pipe having a free turbine and turbine shaft mounted therein, said tail pipe comprising an outer shell having a bend therein, said outer shell comprising a forward section for receiving a stream of hot combustion gases and an aft exhaust section, the axis of said forward section being parallel with the free turbine axis and the axis of said exhaust section being at an angle to said forward section and said turbine axis, a depression formed in said outer shell having a wall extending partially transversely into said stream of said hot combustion gases passing through said tail pipe, an inner shell extending from inside said forward section through said wall, said inner shell being joined to said wall where it extends therethrough, the longitudinal axis of said inner shell being parallel with the longitudinal axis of said forward section, the forward part of said inner shell extending into said forward section being spaced radially inwardly from the wall of said forward section to form therewith an annular duct for said exhaust gases.

9. In a turbo machine, a tail pipe comprising an outer shell defining a duct for the passage of hot exhaust gas therethrough and having a free turbine and turbine shaft mounted therein, said tail pipe also comprising an inner shell supported by said outer shell and extending from within said outer shell through an end wall of said outer shell, said inner shell being mounted in said end wall, a housing located within said inner shell, said turbine and turbine shaft being rotatably supported by said housing, flange means mounting and supporting said housing in said inner shell, said flange means supporting one end of said housing for longitudinal movement with respect to a corresponding end of said inner shell in response to differential thermal expansion and contraction thereof.

10. In a turbo machine, a tail pipe comprising an outer shell defining a duct for the passage of hot exhaust gas therethrough and having a free turbine and turbine shaft mounted therein, said tail pipe also comprising an inner shell supported by said outer shell and extending from within said outer shell through an end wall of said outer shell, said inner shell being mounted in said end wall, a housing located within said inner shell, said turbine and turbine shaft being rotatably supported by said housing, means for mounting and supporting said housing in said inner shell, said housing having end walls in which said turbine shaft is mounted, one of said end walls of said housing being located outside said outer shell and removable from the rest of the housing, said turbine being slidable out of said housing and said housing being slidable as a unit out of said inner shell when said removable end wall is removed therefrom, said turbine being locked in said housing and said housing being locked in said inner shell when said removable end wall is secured to said housing.

11. In a turbo machine, a tail pipe comprising an outer shell defining a duct for the passage of hot exhaust gas therethrough and having a free turbine and turbine shaft mounted therein, said tail pipe also comprising an inner shell supported by said outer shell and extending from within said outer shell through an end wall of said outer shell, said inner shell being mounted in said end wall, a housing located within said inner shell, said turbine and turbine shaft being rotatably supported by said housing, means for mounting and supporting said housing in said inner shell, cooling fluid supply means constructed and arranged to supply cooling fluid to the interior of said inner shell for surrounding the periphery of said housing and an end wall of said housing adjacent to said turbine with a moving layer of cooling fluid to thereby shield said housing and said end wall thereof from hot exhaust gases in said duct.

References Cited in the file of this patent

UNITED STATES PATENTS

| | | |
|---|---|---|
| 2,434,319 | Kalitinsky | Jan. 13, 1948 |
| 2,439,447 | Buck | Apr. 13, 1948 |
| 2,470,126 | Altorfer | May 17, 1949 |
| 2,624,173 | Bloomberg | Jan. 6, 1953 |

FOREIGN PATENTS

| | | |
|---|---|---|
| 710,959 | Great Britain | June 23, 1954 |